United States Patent [19]

Shultz

[11] Patent Number: 4,577,389
[45] Date of Patent: Mar. 25, 1986

[54] AUTOMATIC TOOL CHANGER
[75] Inventor: Walter Shultz, Newport, N.H.
[73] Assignee: Textron, Inc., Providence, R.I.
[21] Appl. No.: 486,419
[22] Filed: Apr. 19, 1983
[51] Int. Cl.⁴ .............................................. B23Q 3/155
[52] U.S. Cl. .................................... 29/568; 29/27 C; 82/36 A
[58] Field of Search .................. 82/36 R, 36 A, 36 B, 82/2.5, 2.7; 29/568, 26 A, 27 R, 27 C

[56] References Cited

U.S. PATENT DOCUMENTS

| | | | |
|---|---|---|---|
| 3,312,370 | 4/1967 | Kolarich et al. | 29/568 X |
| 3,339,273 | 9/1967 | Knosp | 29/568 |
| 3,667,114 | 6/1972 | Smith et al. | 29/568 |
| 3,807,011 | 4/1974 | Harman et al. | 29/568 |
| 3,867,756 | 2/1975 | Koch et al. | 29/568 |
| 3,925,877 | 12/1975 | Sunike et al. | 29/568 |
| 4,312,111 | 1/1982 | Peiser et al. | 29/568 |
| 4,335,499 | 6/1982 | Prat | 29/568 |
| 4,428,109 | 1/1984 | Seeger | 29/568 |

Primary Examiner—Gil Weidenfeld
Assistant Examiner—Glenn L. Webb
Attorney, Agent, or Firm—Anthony P. DeLio

[57] ABSTRACT

An automatic tool changing system and apparatus for turret type and block tool type lathes. The invention generally comprises an improved automatic indexable turret having a plurality of tool clamping units actuatable for engaging and disengaging a tool, an automatic indexable tool storage/feeder mechanism for supplying and receiving tools, and an automatic tool manipulating and transporting means disposed for operative association with said turret and said tool storage/feeder mechanism for selectively exchanging tools in response to a programmed numerical control unit or system.

3 Claims, 15 Drawing Figures

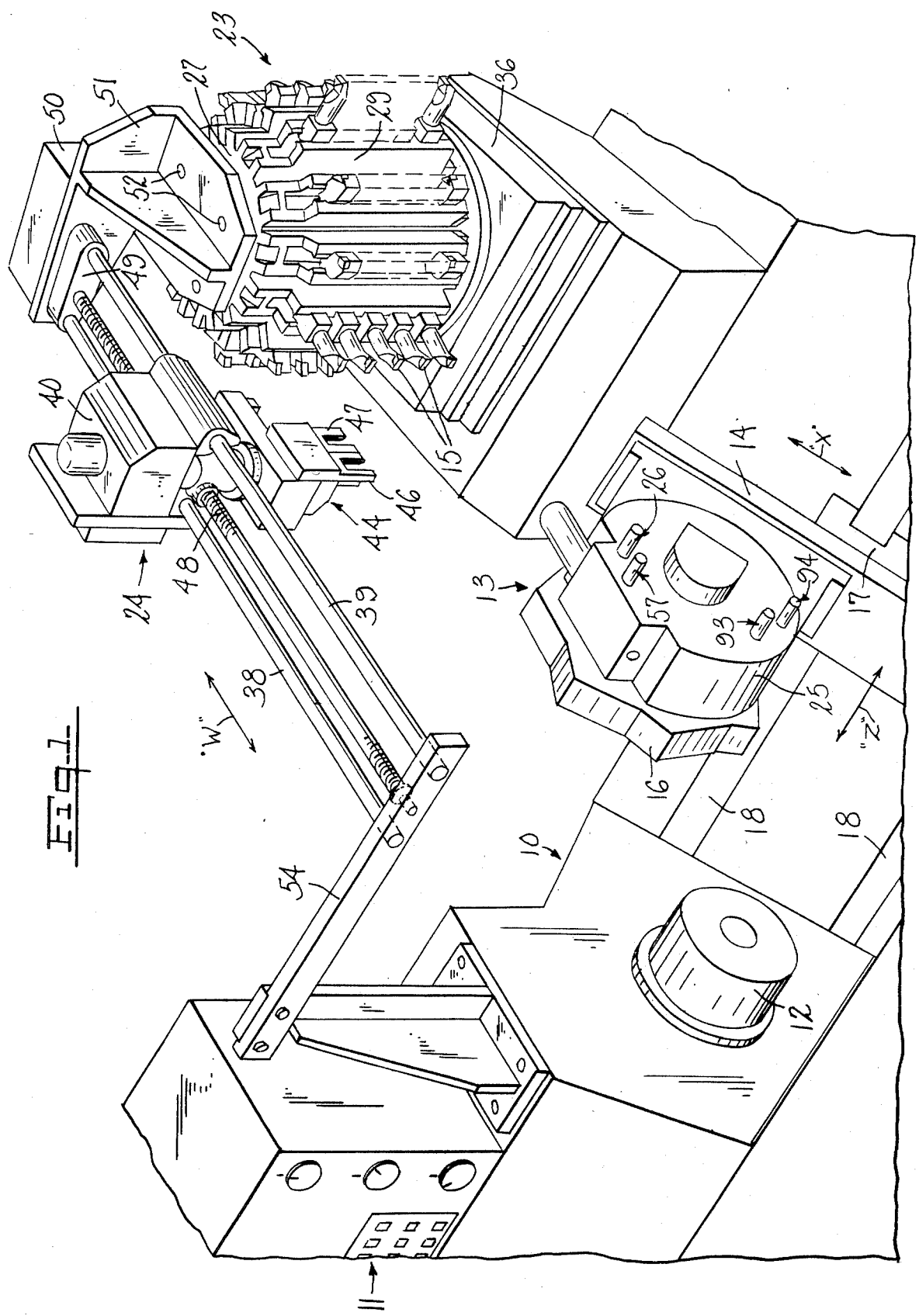

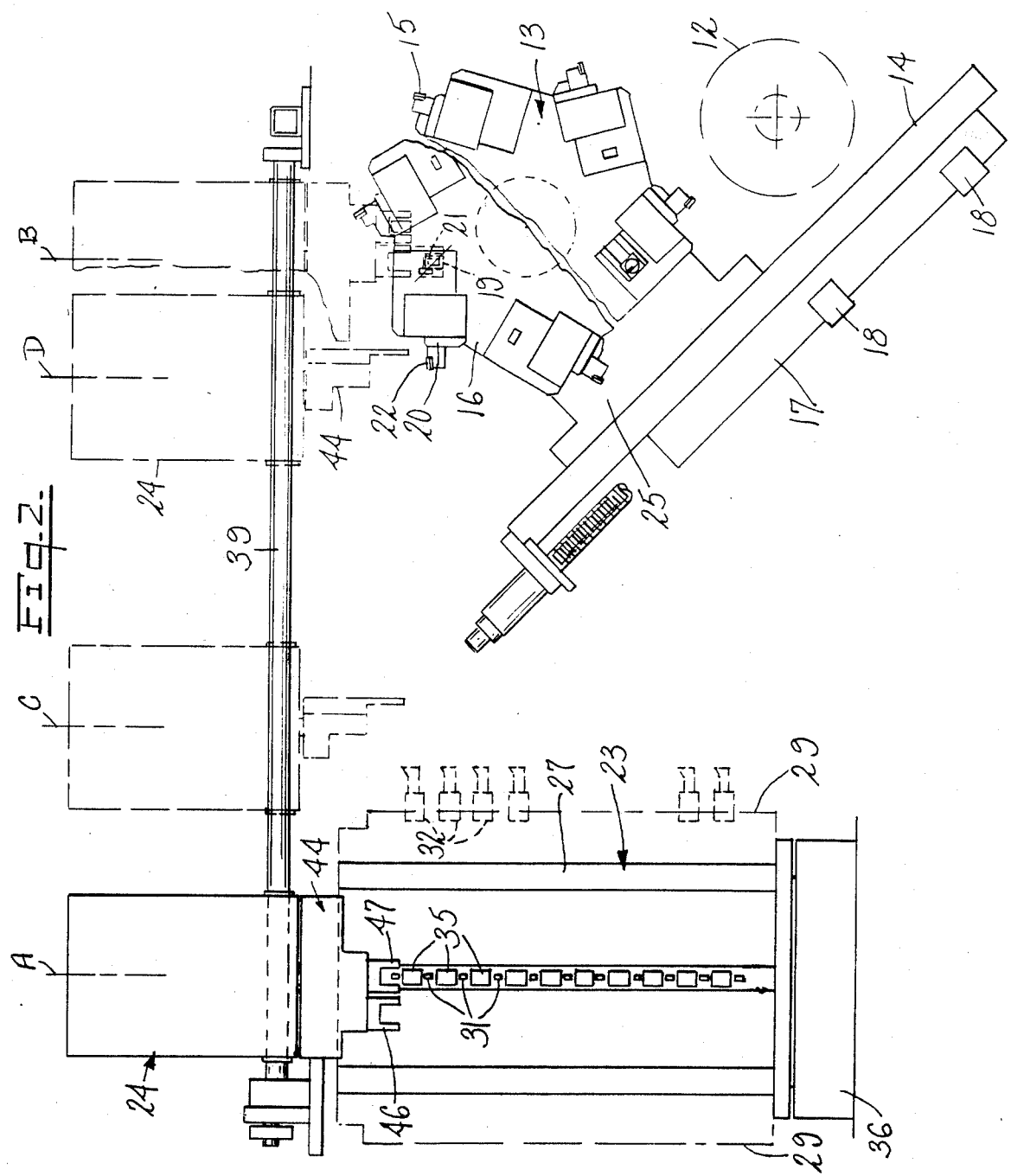

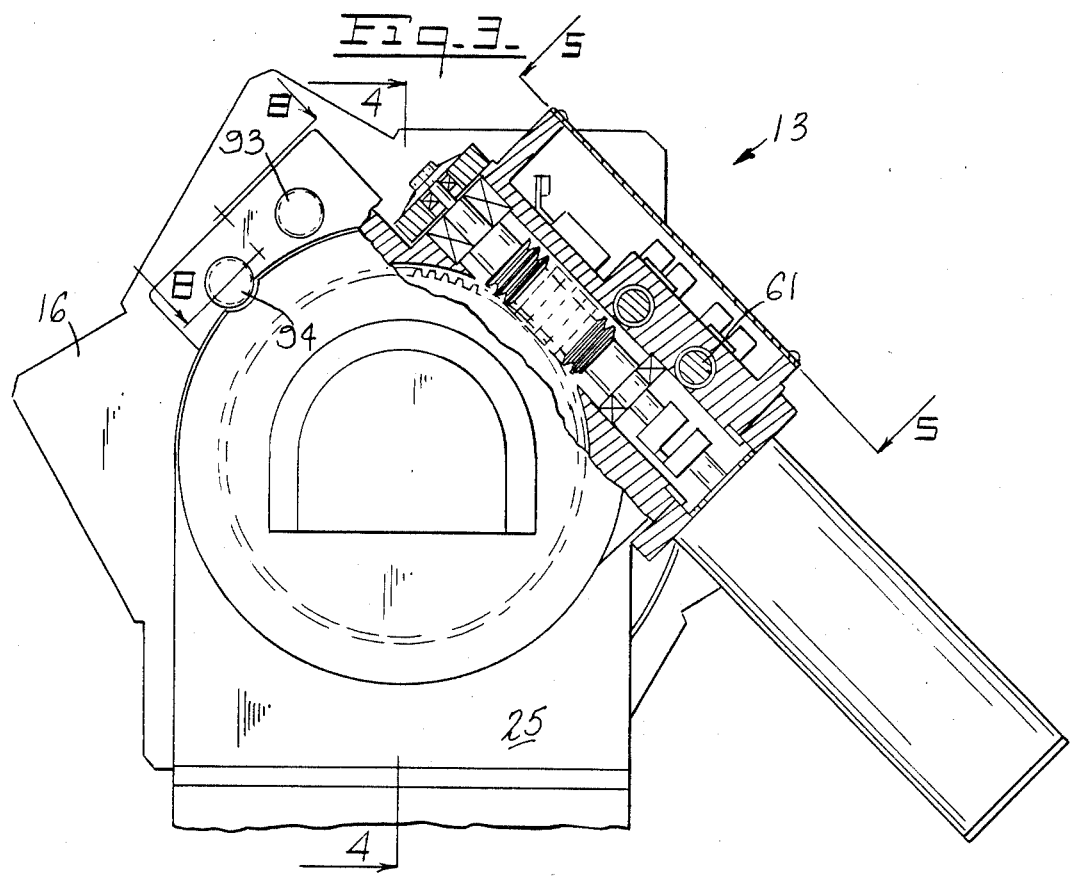
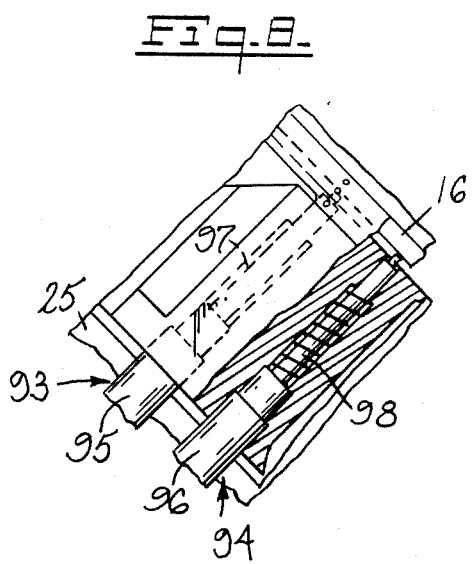

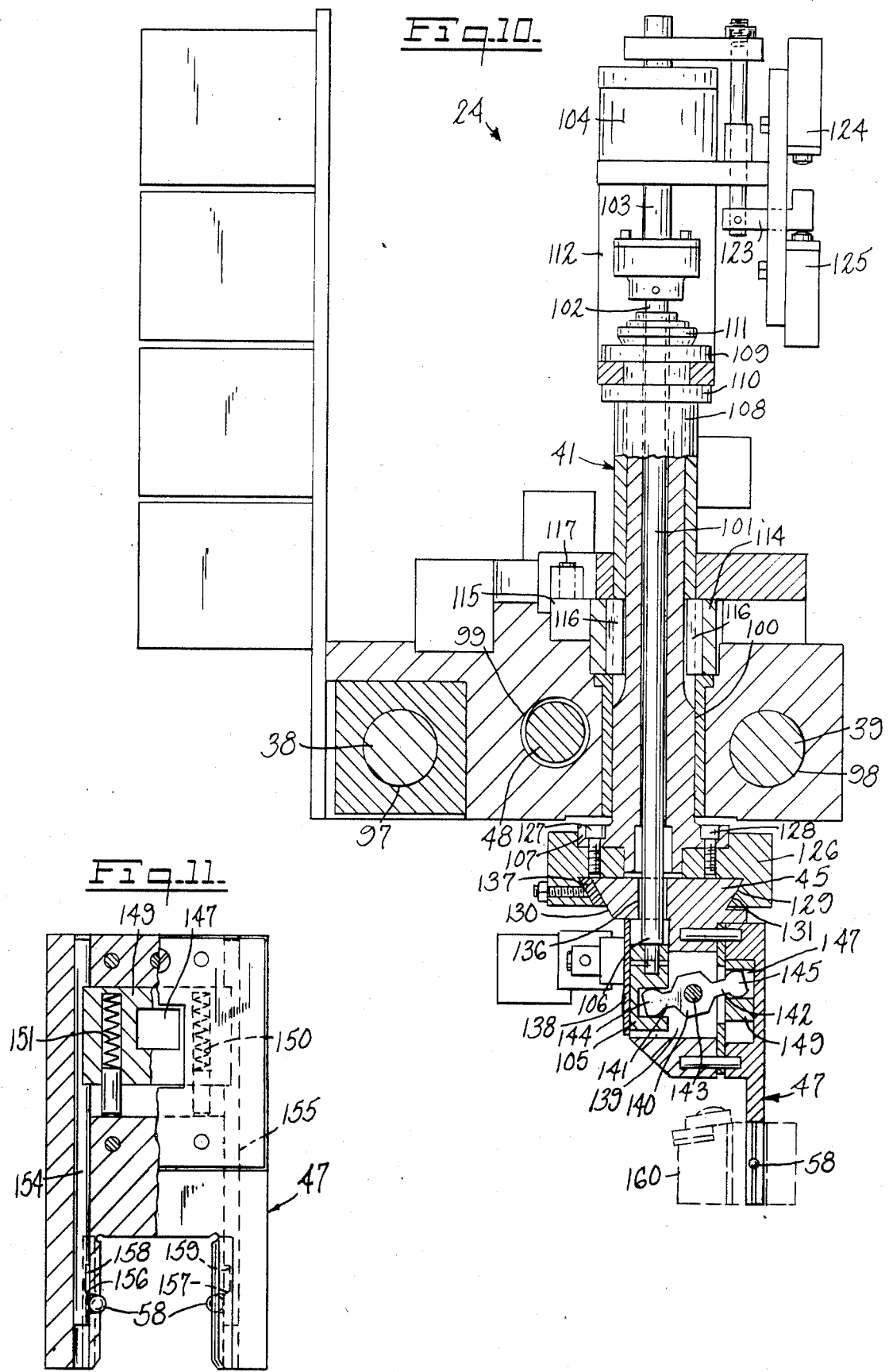

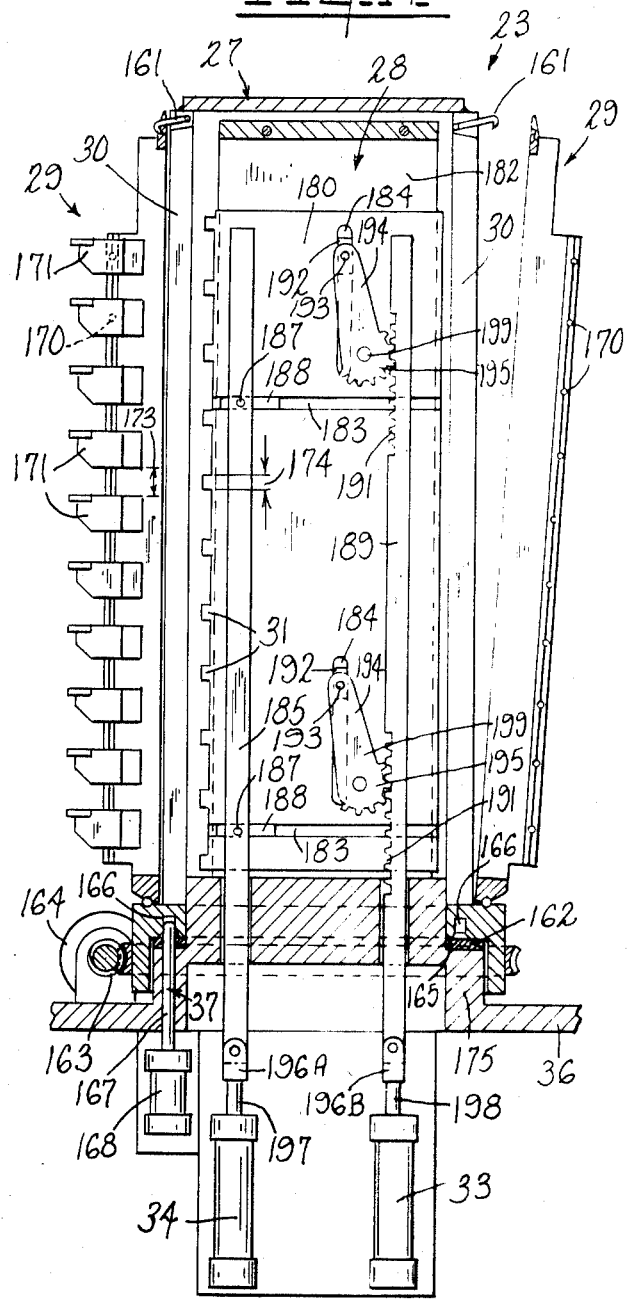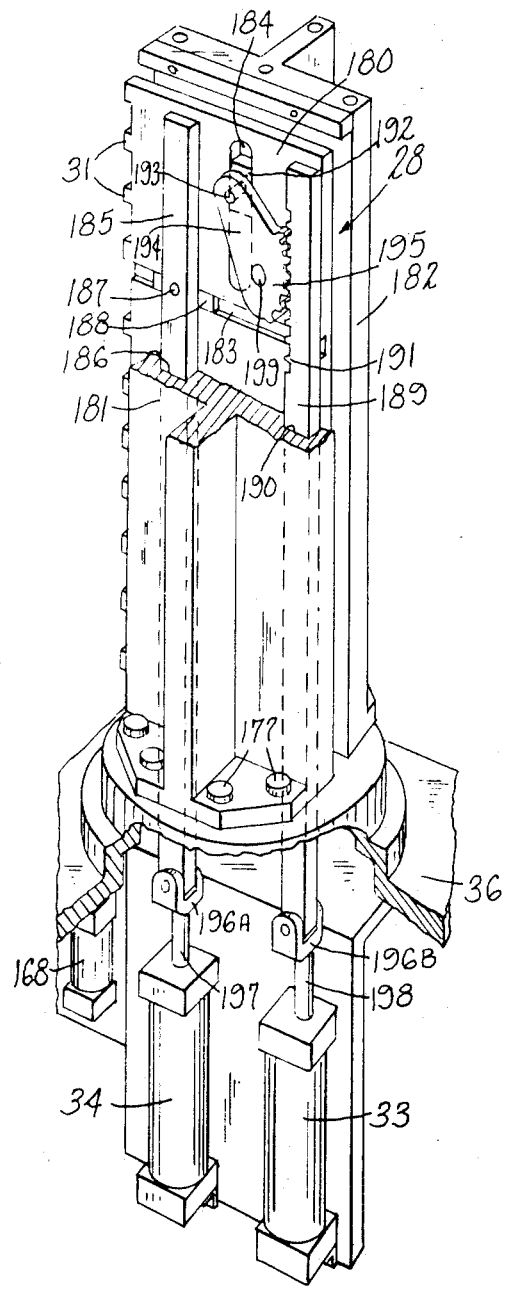

AUTOMATIC TOOL CHANGER

FIELD OF THE INVENTION

This invention relates to turret type and block tool type lathes and, more particularly, to a system and apparatus for automatically replacing cutting tools mounted on the turret.

BACKGROUND OF THE INVENTION

With the advent of numerical controls for machine tools, there has been a continuing emphasis to design such machine tools so that the cutting operation and motions thereof may be properly programmed with relation to the other parts of the machine. U.S. Pat. No. 3,486,209 to Robert S. Jones and Walter Shultz discloses a turret lathe wherein both end working tools and peripheral turning tools are mounted in fixed spatial relationship to a slide, and the slide is positionable relative to a workpiece in accordance with the cutting program. The application of such numerical controls to turret type lathes has greatly facilitated the automation of drilling, turning, boring and threading capabilities. A principle disadvantage, however, of these prior art controlled turret lathe systems resides in the necessity for manual replacement of the cutting tools. Thus, time-consuming interruptions have been occasioned from time to time during the automatic tooling process of machine parts, etc. to enable costly manual replacement of cutting tools which have worn out or whose useful function has been completed.

PRIOR ART STATEMENT

According to one prior art device, a turret carrying a plurality of driveable end working tools is selectively indexable and a single drive means is arranged to be coupled to and uncoupled from each driveable tool when indexed to an operative position. The spindle is arranged to be driven at turning speeds for operation with turning tools, and also at feed speeds in conjunction with end working tools so that irregular contours, slots, indentions, etc., may be machined in the end face and also the peripheries of a workpiece. The end working tools may also perform drilling, boring and tapping operations on the workpiece as it is indexed into position.

Another prior art turret indexing mechanism is described in U.S. Pat. No. 3,545,317 issued Dec. 8, 1972 to Walter Shultz et al. The device described in this patent is directed to a mechanism for positioning a tool carrier of a turret lathe. The device generally comprises a base, a tool holder, tooth face coupling means on both the base and tool holder and means forming a portion of the base for raising and lowering the tool holder to separate and to cause engagement of said tooth face coupling means on both said holder and said base. In addition, means for rotating said tool holder to index the mechanism during the period of time that the mating tooth face coupling means of said base and said tool holder are separated.

The above-cited patents are incorporated herein to the extent necessary and are mentioned as being representative of the prior art. Other pertinent references may exist.

For example, in contrast to the prior art, the present invention provides a new and improved automatic tool changing system and apparatus for a turret type or block tool type lathe. The system, generally speaking, utilizes a numerical control system to monitor the wear of a cutting tool and/or the completion of a cutting tool's useful function and for directing the automatic replacement thereof. The new and improved apparatus of the automatic tool changer comprises a turret having a base portion and a rotatable plate member with a plurality of automatically actuatable tool holders for engaging and disengaging a cutting tool. A hydraulic or other suitable actuating means is mounted within the base portion and contains a piston which is extendable for actuating the tool holders with said turret being indexed to a predetermined tool replacement position. An indexable drum-like tool storage mechanism and comb-like feeder are provided to receive and dislodge tools therefrom. A tool manipulating and transporting means is provided for obtaining a new cutting tool from said storage mechanism and transporting the same for replacement automatically under the influence and control of a preprogrammed numerical control system. The tool changing system and apparatus of the present invention is designed to facilitate the replacement of tools in a lathe and in an expeditious manner.

SUMMARY OF THE INVENTION

An automatic tool changing system and apparatus for a turret lathe comprising:

control means;

a turret having a base portion and a rotatable plate member, said rotatable plate member having a plurality of tool clamping units each with securing means actuatable for engaging and disengaging a tool within the respective tool clamping unit;

actuator means mounted on said base portion and having a piston extendable for actuating said securing means;

a tool storage and feeder mechanism; and a tool manipulating and transporting means disposed for operative association with said turret and said tool storage and feeder mechanism for selectively exchanging tools automatically upon command of said control means.

Accordingly, it is an object of the present invention to provide a new and improved system for automatically changing tools in a turret type lathe.

Another object of the present invention is to provide a new and improved tool storage and feeder mechanism which facilitates the automatic storage and provision of numerous cutting tools.

Another object of the present invention is to provide a new and improved tool transporting and manipulating mechanism which facilitates the replacement of tools with a single transporting trip between the storage medium and the turret or a fixed tool block.

Another object of the invention is to provide a new and improved actuator mechanism for actuating a tool clamping unit.

A further object of the present invention is to provide a new and improved turret lathe having a mechanical cutting tool changer capable of automatic operation and incorporating suitable hydraulic actuators and electrical interlocks.

BRIEF DESCRIPTION OF THE DRAWINGS

The foregoing and other objects of this invention, which will become more fully apparent from the following detailed description, may be achieved by means of the exemplifying apparatus depicted and set forth in this specification in connection with the accompanying drawings. Similar reference numerals refer to similar parts throughout.

FIG. 1 is a partial perspective plan view of the automatic tool changer for incorporation with a turret lathe;

FIG. 2 is a diagrammatic side elevational view of the automatic tool changer in accordance with the present invention;

FIG. 3 is a rear view of the turret, partly section;

FIG. 8 is a sectional view taken along line 8—8 of FIG. 3;

FIG. 10 is a sectional view taken along line 10—10 of FIG. 9;

FIG. 11 is an enlarged plan view partly in section, showing a gripper mechanism in accordance with the present invention;

FIG. 14 is a vertical sectional view of the storage drum; and

FIG. 15 is a perspective view of the comb feeder mechanism in accordance with the present invention.

DETAILED DESCRIPTION OF THE PREFERRED EMBODIMENT

Figure 4:
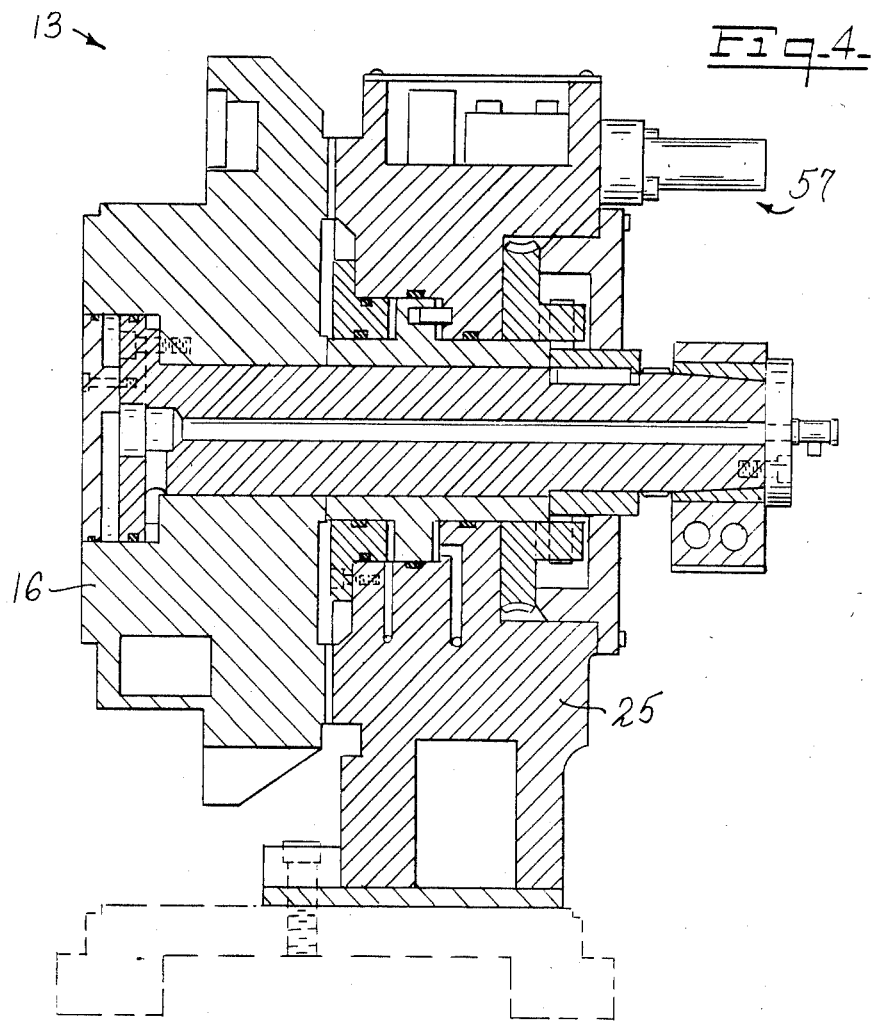
FIG. 4 is a sectional view taken along line 4—4 of FIG. 3.

With reference to FIG. 1, a machine or turret lathe 10 embodying the invention is shown. The turret lathe 10 is generally controlled by means of a (numerical) control unit 11. The basic design and operation of numerical or system controlled turret lathes are known, for example, a TNC model lathe and a CNC control system each available from Jones & Lamson of Springfield, Vt., and therefore, will not be described in detail herein to avoid prolixity. Briefly stated, the turret lathe 10 includes a head stock portion having a drive means adapted to rotate or index a work holding member such as a faceplate or a chuck 12 adapted to hold a workpiece. An indexable turret 13 is carried on a slide 14. The turret 13 is adapted to receive a plurality of working tools as exemplified at 15. The turret plate 16 is indexable to selected angular positions, under control of the numerical control unit 11, by means of any suitable drive motor, to present a selected working or cutting tool mounted thereon to a workpiece (not shown) in chuck 12. Slide member 14 is movable generally in the X-axis as shown in FIG. 1 on a slide 17 by means of any conventional positioning and feed motor (not shown). In this manner, slide 14 is generally movable upwardly and downwardly along a sloped path for selectively positioning the turret 13 relative to chuck 12 and/or in an upward and inwardly disposed position relative thereto as depicted in FIG. 1. Slide 17 is further movable along the Z-axis on a pair of rails or ways 18 by a conventional positioning and feed motor (not shown).

As thus far described, slide 14 and, therefore, indexable turret 13, are selectively positionable to present either a working tool to a workpiece in chuck 12 or to present a selected working tool in a spatial relationship for being engaged by a tool gripping mechanism, as will be described in greater detail hereinafter.

With reference now to FIGS. 1 and 2, the present invention, in basic terms, comprises an automatic tool changing system and apparatus for incorporation into a turret lathe 10. The automatic tool changing apparatus, in accordance with the present invention, comprises an automatic indexable turret 13 having a plurality of internal and external tool clamping units 19 and 20 each being selectively actuatable for engaging and disengaging a tool 21 and 22 respectively, an automatic bidirectionally indexable tool storage/feeder mechanism 23 for supplying and receiving tools, and an automatic tool manipulating and transporting means 24 disposable for operative association with said turret 13 and said tool storage/feeder mechanism 23 for selectively exchanging a new tool for a worn tool or a tool whose useful function has been completed in response to preprogrammed loading instructions stored in the control unit 11.

For purposes of explaining the general operation and function of the present invention, a brief description of the constituent elements of the system's apparatus will first be provided, it being understood that a complete description of each of these elements is provided separately hereinafter.

As noted above, the turret 13 basically includes a non-rotatable base portion 25 and an indexable plate member 16 having a plurality of tool clamping units 19 and 20 thereon. The tool clamping units 19 and 20 may be of conventional design. In accordance with one feature of the present invention, a new and improved actuator mechanism 26 for automatically controlling the function of such tool clamping unit, under the control of control unit 11 is provided.

The tool storage/feeder mechanism 23 basically comprises an indexable drum 27 and an internally disposed comb-feeder mechanism 28. The drum 27 is hollow and facetted on its exterior (generally parallel to its rotation axis) each facet having detent or other conventional securing means for receiving and retaining accurately a respective tool holding magazine 29. The number of facets or vertical elongate magazine receiving slots 30 and therefore, magazines, is limited only by the physical space available or the number of tools desired for storage.

In accordance with the preferred embodiment of the invention, twelve magazines each having a capacity for retaining ten working tools, are mounted in spaced vertical disposition about the drum 27 each on a respective facet. Each tool holding magazine 29 is designed to accept tools in a manner that allows them to be uniformly spaced in a vertical column and being secured in a guide along the long axis of the magazine. Any conventional design magazine may be utilized, for example, which incorporates spring biased detents for yieldably maintaining the tools in the spaced vertical column relationship as generally depicted in FIGS. 1 and 2.

It should be understood at this time, however, that the drum 27 may be adapted to incorporate the magazine function thereby eliminating the need for separately loadable magazines. A plurality of mountable magazines are utilized in the preferred embodiment of the invention as depicted to enable flexibility for preloading the working tools for minimizing machine down-time.

The comb-feeder mechanism 28 (see FIGS. 14 and 15) includes a plurality of teeth-like members 31 each of which is configured for being selectively interposed between the body portions 32 of the working tools as spaced in the magazines 29.

The comb-feeder mechanism 28 is operated by a pair of linear motion devices, for example, hydraulic cylinders 33 and 34, such that the comb can be moved both along the axis of the drum and in a direction at 90 degrees thereto. In this manner the teeth 31 may be extended outwardly within a respective facet and between working tools 35.

The two motions noted above, used sequentially, enables the teeth 31 of the comb member to be selectively moved in a rectangular motion pattern such that in one direction the tools 35 are incremented in an upward direction one pitch or in the other direction can decrement all tools in a magazine downwardly one pitch. The comb teeth members 31 may be retracted in an inward direction from the facets whereby the drum 27 and mounted magazines 29 may be rotated to a selected index/magazine position.

The drum indexing mechanism may be of conventional design such as a servo motor operatively controlled by the control system (CNC) to enable loading of the drum in either rotational direction to a desired magazine position. The servo motor may include a worm gear secured to the drum and a worm driven by the closed loop servo system. It should be recognized, however, that simpler drive methods may be utilized, for example, an AC motor and brake, driving through a spur gear reduction. The indexing mechanism is generally mountably contained within the base unit 36 of the drum/feeder unit 23. To ensure accurate indexing to a selected position, the end point or alignment of each facet position may be accurately located by a shot pin arrangement 37 of conventional design. The comb motion and shot pin 37 may be monitored by limit switches (not shown) which are operatively connected to the numerical contol unit 11.

Figure 9:
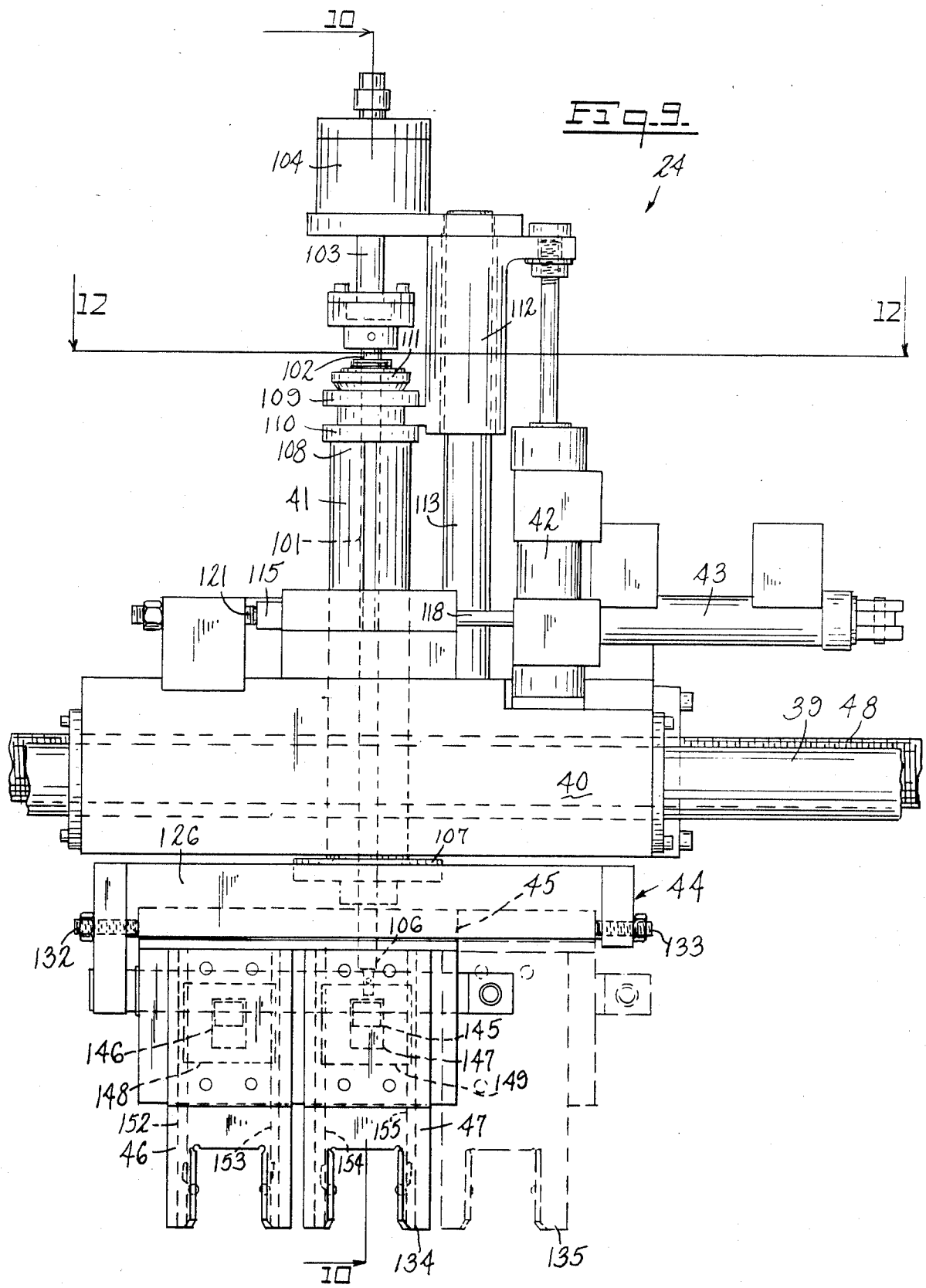
FIG. 9 is an elevational view of the tool manipulating and transporting mechanism in accordance with the present invention.
Figure 12:
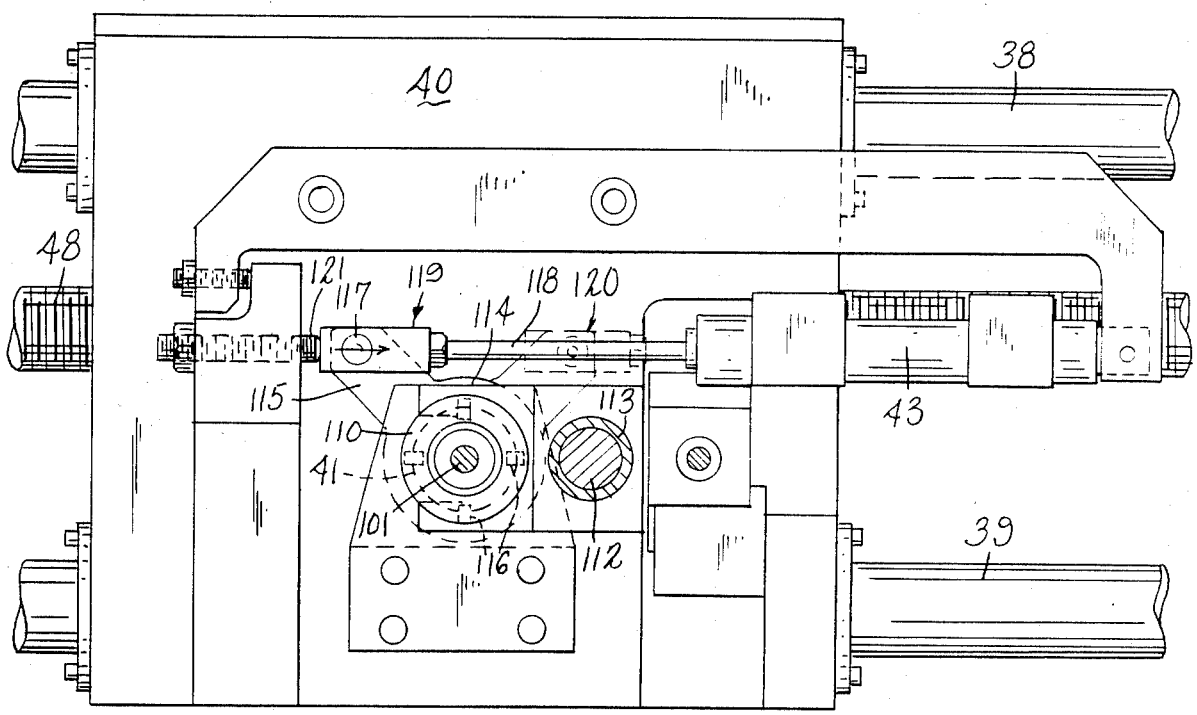
FIG. 12 is a sectional view taken along line 12—12 of FIG. 9.
Figure 13:
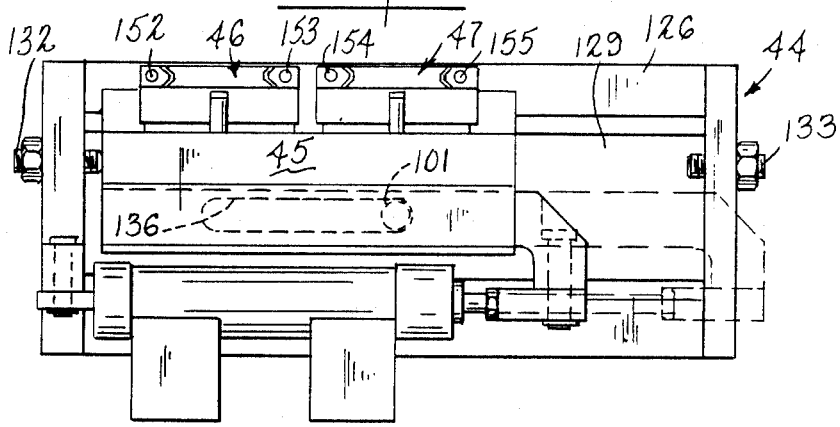
FIG. 13 is a bottom view of the slide block shown in FIG. 9.

The tool manipulating and transporting means 24 is a bidirectional five motion tool handling assembly capable of loading, unloading, transporting and exchanging tools. It generally consists of a pair of guideways 38 and 39 supporting a carrier 40. Mounted on the carrier at a 90 degree angle or another appropriate angle, to the guideways 38 and 39, is a round hollow ram 41 (see FIG. 9). The ram 41, as will be described more fully hereinafter, is guided to slide axially with the stroke controlled by air or hydraulic cylinder 42. The ram 41 is further arranged with sliding keyways and an arm such that an air or hydraulic cylinder can swing it, for example, through a 90 degree rotational angle. Connected at the lower end of ram 41 is a shuttle member 44 which carries a slide block 45 that moves, for example, at a 90 degree angle to the axis of ram 41. This is called the shuttle motion.

The slide block 45 includes a pair of gripper mechanisms 46 and 47. The grippers 46 and 47 have an inverted U-shape for receiving therein a respective working tool. Each of the legs of the grippers 46 and 47 have detent or ball-like members for engaging the base portions 32 of a working tool. To facilitate this gripping action, the working tool base 32 may be provided with a small pocket or drilled alcove or groove such that when the gripper slides down over the tool the detent ball may be urged therein for engaging and securing the working tool.

The carrier 40 is moved along the guideways by a nut and screw arrangement. The screw generally comprises an elongate threaded shaft 48 interposed between and parallel to guideways 38 and 39. Shaft 48 is secured on one end with bearings to a support housing 49 which also supports guideways 38 and 39. Shaft 48 may be rotated by conventional means, for example, servo motor 50 controlled by means of CNC 11. Servo motor 50 and mounting bracket 51 are secured to the tool storage/feeder mechanism 23, for example, by means of bolts 52.

The other ends of guideways 38 and 39 and shaft 48, are supported by a cantilevered arm member 54 extending outwardly from lathe 10. The transverse position of the carrier 40 along guideways 38 and 39 may be selectively controlled by means of limit or over-travel switches (not shown) operatively coupled to control unit 11. It should be understood, however, that an alternative method of selectively positioning the carrier 40 along guideways 38 and 39, may comprise an arrangement of fixed stroke cylinders replacing the screw, nut and servo motor arrangement as described above.

Prior to a discussion of the operation of the automatic tool changer, it should be recognized that the working tools may be automatically replaced following a predetermined cutting or drilling cycle (period) or when a corresponding amount of wear has been determined by calculation or empirically.

In accordance with another feature of the present invention, an additional set of tool clamping units (see FIGS. 3 and 8) are provided to enable manual replacement of the internal and external tools by an operator.

OPERATION

With continued reference to FIGS. 1 and 2, the general operation of the automatic tool changer will now be described. For ease of understanding, the tool carrier 40 is illustrated at four positions A, B, C and D (three of which, B, C, and D, are shown in phantom outline) along guideways 38 and 39. Position A is generally referred to as the home position, which corresponds both to the new tool pick-up location and the inactive or ready position of carrier 40, i.e., the basic status when not changing tools. Position B of carrier 40 illustrates the location of the carrier 40 when activated for retrieving a selected internal tool. Position C generally illustrates the position of the grippers 46 and 47 normal to guideways 38 and 39, effected during transport intermediate the tool storage/feeder mechanism 23 and turret 13. Position D corresponds generally to the location and orientation of shuttle 44 effected for replacement of external tools.

If we now assume that internal working tool 21 has been selected, via control unit 11, for replacement, the following sequences or operations are initiated in accordance with the preprogrammed instructions loaded into control unit 11.

Turret 13 is located, by means of motorized or hydraulic slides 14 and 17, to its predetermined tool replacement location(s), for example, as illustrated in FIG. 2. As noted above, the slides 14 and 17 in known manner enable the positioning of the turret 13 selectively in various X and Z axis locations due to its two motions along a sloped path.

The storage drum 27 is selectively indexed to that magazine (drum position) recognized as containing the desired new working tool 35. The drum 27 is locked or secured in position with the selected magazine 29 being aligned at the home position A by means of a shot pin mechanism 37.

The comb-feeder mechanism 28 (see FIG. 15) is actuated to move teeth 31 outwardly for engaging the column of working tools 35 generally as shown in FIG. 2. Next, the comb-feeder mechanism 28 is caused to move upwardly a predetermined one index position whereby a tool 35 is urged into gripper 47 (shown in phantom outline). The detent or holding means (see FIG. 9) of gripper 47 is actuated to hold the new working tool 35. Then, the comb-feeder mechanism 28 is retracted from magazine 29 and is positioned within the internal cavity portion 55 of drum 27. Slide block 45 indexes to the right a predetermined distance equivalent to the width of a gripper, to align its gripper 46 in preparation for engaging the tool 21, which is to be replaced.

With the new tool 35 being held by gripper 47, the carrier 40 is transported, by rotational actuation of shaft 48 to position B. When at position B, which can be determined by control 11 (limit switches or other conventional menas) a ram or plunger mechanism 41 carried within carrier 40 is actuated for positioning gripper 46 downwardly (shown in phantom outline) whereby it is positioned for engaging the selected tool 21. Next, the detent balls 58 of gripper 46 are biased inwardly toward each other for securing the tool 21 therebetween.

Shortly thereafter, the automatic tool holder actuator 57 (see FIG. 6) is actuated, via control unit 11, to cause tool clamping unit 19 to disengage or release tool 21. This enables gripper 46 to remove the tool 21 with upward motion of ram 41.

The slide block 45 is then indexed to the left a predetermined one gripper (width) position for aligning the new tool 35 with the clamping unit 19. With downward actuation of ram 41, gripper 47 is caused to transport and insert tool 35 about a portion of tool clamping unit 19 which is designed to engage same.

Following the mounting of the new tool 35 within tool holder clamping unit, clamping unit 19 is caused to securely engage the new tool 35 while the gripper detents 58 are caused to disengage from or release their hold on tool 35. Thence, gripper 47 is retracted to its upward position.

The above generally summarizes the tool exchanging process. However, to prepare or set-up the automatic tool changer 24 for another tool exchanging cycle, the tool 21 is first deposited within a selected storage magazine. The storage process for worn tools will now be described.

Carrier 40 is translated to a position A, (FIG. 2) via rotation of shaft 48, and slide block 45, indexes to the right such that gripper 46 and worn tool 21 are aligned with comb-feeder 28. Drum 27 is indexed to a selected worn tool storage magazine position (not shown). As noted above, drum 27 may be locked in position by a shot pin.

With actuation of the comb-feeder mechanism 28 to translate the teeth 31 upwardly one index position, i.e., the thickness of a tool base portion 32, and thence outwardly, its uppermost tooth 178 (see FIG. 15) is positioned above the worn tool 21 being held within gripper 46. Gripper 46 is then caused to disengage or release its detent hold on the worn tool 21. Next, the comb-feeder mechanism 28 is translated downwardly whereby the worn tool 21 is deposited or lodged within the selected magazine. The teeth 31 of the comb-feeder mechanism 28 are then withdrawn into the drum cavity 55.

The final step in the set-up process is to reposition the slide block 45 such that gripper 47 is again aligned about the home position A for obtaining a new tool with initiation of a tool replacement cycle.

It should be recognized at this time that only the major tool changing events have been described for the sake of brevity and ease of understanding. It will be understood that numerical control units are programmable to accommodate the numerous detail steps, for example, such as inserting and retracting the shot pin with drum indexing, such operational details not forming part of the present claimed invention.

The process for exchanging an external tool 22 is similar to that described above for internal tool 21, except that the shuttle 44 is translated into the general orientation as illustrated at positions C and D for aligning the grippers 46 and 47 with an external tool 22.

The structural details of the mechanical tool changing elements of the preferred embodiment will now be described separately.

AUTOMATIC ACTUATOR MECHANISM

With reference to FIGS. 3–8, each automatic actuator mechanism, in accordance with the present invention, is substantially mounted within cavity portions of the turret 13, and generally comprises a hydraulic cylinder having an extendable shaft, a return spring, a split collar or yoke, an intermediate pin, and a tool clamping unit actuator shaft or pin having a return spring. In accordance with the preferred embodiment, a pair of automatic actuators 26 and 57 are provided for actuation of the external 20 and internal 19 tool clamping units respectively. Since the components and operation of the automatic actuators 26 and 57 are identical, except for the length of pins 60 and 65, the below description will be directed to only one (internal) actuator 57, it being understood that the discussion is equally applicable to actuator 26.

The turret 13, as noted above, has a base portion 25 and an indexable face plate member 16. The basic structure and operation of turret 13, except for the automatic actuators 26 and 57, may be of conventional design for utilizing 2, 3, 4, 6, 8, 12 or more tooling positions. The turret 13 shown in FIGS. 1 and 2 has six tooling positions each having an internal 19 and an external 20 tool clamping unit(s). The face plate member 16 is indexable relative to the base portion 25 by use of face tooth coupling therebetween in a manner well known in the art field. In the preferred embodiment a total of 24 increment face teeth and a servo drive (not shown), and appropriate software for providing 15 degree increment capability was selected to enable servicing by the automatic tool changer and manually at a convenient location(s) and positioning of the turret 13.

As noted previously, the tool clamping units 19 and 20 may be of conventional design for clamping a tool by use of the force applied on a drawbar, for example, by means of a "Belleville" spring washer package working on a leverarm system. The working tool or block tool within a tool clamping unit 19 and 20 is unclamped by pushing a leverarm 67, or plunger (not shown).

The actuator pin 65 is slidably mounted within a cavity 68 of the turret face plate 16, and has a head portion 69 for engaging/actuating the tool clamping unit 19 and 20 with inward pressure on the leverarm 67 or plunger (not shown). The other end 70 of pin 65 is exposed intermediate the turret base portions 25 and the face plate 16 for being aligned with intermediate pin 64 with proper indexing, via control unit 11, of faceplate 16 (shown in FIGS. 5 and 6). Return spring 66 is biased between head portion 69 and a ledge portion 71 of the face plate 16 for maintaining the actuator pin 65 for preventing end portion 70 from abutting coupling base teeth during indexing of the faceplate 16.

The intermediate pin 64 is cantilevered, for example, by a screw means 72, from a bottom end portion 73 of yoke 63. The outermost end 74 of pin 64 is slidably mounted within base portion hole 75 for being outwardly extendable for abutting with the actuator pin end 70 during tool replacement operation, thereby urging same inwardly.

Shaft 61 is slidably received in a hole/cavity portion 76 of the base portion 25. Shaft 61 is operatively connected at one end to a hydraulic cylinder 59, with its other end 77, which is of smaller diameter, being slidably received within hole 78. Shaft 61 is engaged or clamped at an intermediate portion by yoke 63, which has a tightening bolt 79. Return spring 62 is biased between an enlarged portion 80 of shaft 61 and a ledge portion 81 of base member 25 for maintaining shaft 61 and, thereby, pin 64 inwardly positioned (as shown in FIGS. 5 and 6) with the actuator cylinder 59 being deactivated.

Figures 5, 6, 7:
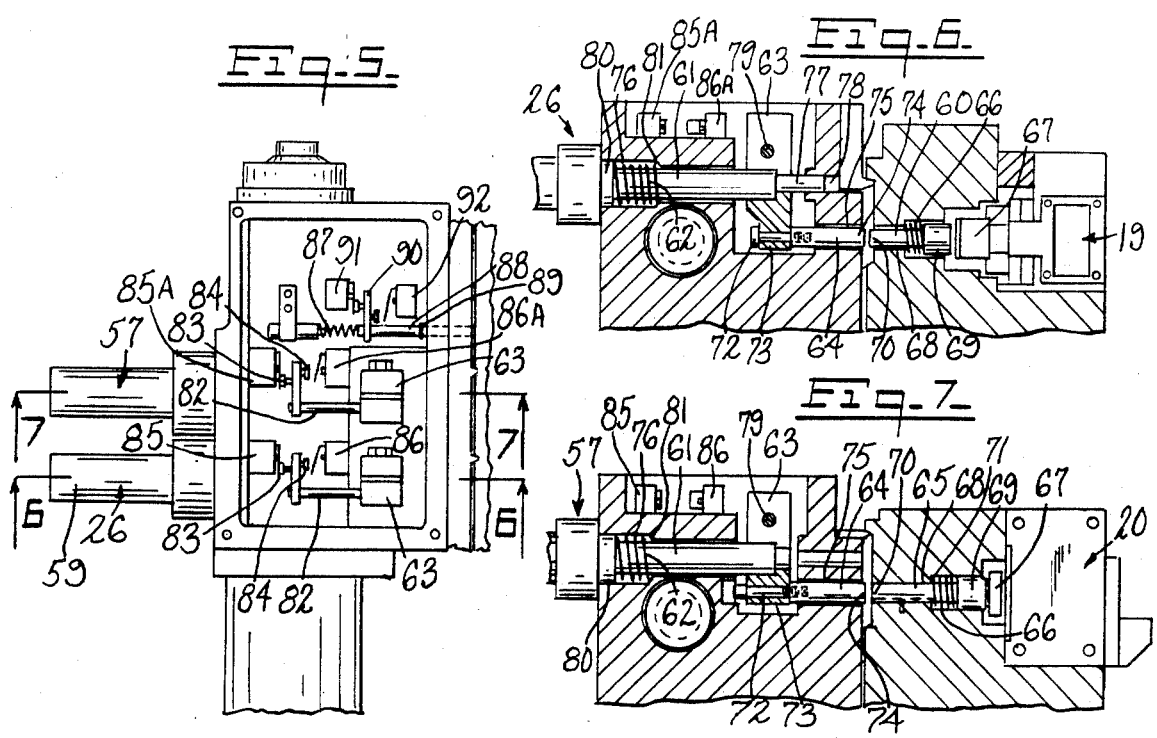
FIG. 5 is a sectional view taken along line 5—5 of FIG. 3.
FIG. 6 is a sectional view taken along line 6—6 of FIG. 5.
FIG. 7 is a sectional view taken along line 7—7 of FIG. 5.

The split collar or yoke 63 has an arm portion 82 cantilevered from its top end which includes a pair of limit switch buttons 83 and 84 (see FIG. 5). These buttons 83 and 84 are intermediate two limit switches 85 and 86 for actuating either, determined by the position of yoke 63, i.e., whether the automatic internal actuator 57 has been activated. Limit switches 85A and 86A monitor the operation of the external (tool) actuator 26. The limit switches are operatively connected to control unit 11.

A spring biased plunger 88 having a stop washer 89 and contact arm 90 is provided, which when operatively associated with limit switches 91 and 92, monitors the coupling and uncoupling status between the base portion 25 and face plate 16 of turret 13.

In accordance with one feature of the invention, as noted above, the actuator mechanisms 26 and 57 are substantially mounted within the turret base portion 25 which enables minimizing of the number of actuators required for a multi-tool turret, and eliminates the need for rotating hydraulic unions.

With reference to FIG. 3, the location of the internal and external hydraulic shafts 61 within base portion 25 are illustrated in section. It should also be noted that two additional actuators 93 and 94 are provided within base portion 25 for operator initiated (manual) tool replacement. The general structure of the manually operated actuators 93 and 94 is generally shown in FIG. 8. As can be seen, these actuators each have a hydraulic cylinder 95 and 96 which actuates a shaft 97 and 98, respectively, for engaging, with proper indexing of faceplate 16, a selected actuator pin 65. A selector valve (not shown), which is manually operated, and is mounted on the turret, directs hydraulic fluid to either the automatic actuator cylinder 57, 26, or manual activator cylinder 93, 94.

TOOL MANIPULATING TRANSPORTER

With reference to FIGS. 9–13, the structure of the tool manipulating and transport mechanism 24 will now be described.

The tool manipulating and transport mechanism or tool changer 24 comprises, generally speaking, a carrier 40, a shuttle 44, a pair of grippers 46 and 47, a pair of laterally spaced parallel guideways or rods 38 and 39, and a drive shaft 48 actuatable by means of a servo motor 50 controlled by unit 11. The transverse position of the carrier 40 along guideways 38 and 39 may be monitored by conventional means (not shown) such as, for example, limit switches being operatively connected to control unit 11.

The carrier 40 has a pair of spaced elongate support holes 97 and 98 for slidably receiving rods 38 and 39, respectively. A threaded hole or nut portion 99 is provided intermediate holes 97 and 98 for matingly receiving threaded shaft 48, whereby lateral carrier 40 motion may be effected with rotation of shaft 48.

Cylindrical ram 41 is vertically and slidably received within central bore 100. An elongate gripper rod 101 is mounted at one end 102 to a plunger or piston 103, which is driven upwardly or downwardly by, for example, hydraulic cylinder 104. Gripper rod 101 extends within ram 41 and is affixed to a lever actuator 105 at its bottom end 106. Ram 41 is affixed to shuttle 44 at its bottom end 107 for vertically and rotatably positioning the shuttle 44. The other or top end 108 of ram 41 is affixed, via a pair of washer members 109, 110 and locknut 111, to a vertical motion coupler 112. The vertical motion coupler 112 is axially slidably mounted on shaft 113 and is controllably translated by means of a hydraulic cylinder 42, which is operatively connected to control unit 11.

A washer member 114 having a tab or arm 115 is keyed at 116 to ram 41 for causing rotation of ram 41 through a predetermined angle-of-rotation, while enabling axial travel of the ram 41 with actuation of hydraulic cylinder 42. Such rotation through its predetermined angle is necessary to position the gripper for engaging the external tools. Tab 115 is pivotably mounted about pin 117, which is affixed to piston 118. Piston 118 is longitudinally translatable between predetermined first 119 and second 120 (shown in phantom outline) positions by means of hydraulic cylinder 43. Stop 121 is provided to prevent overtravel and, thereby, to controllably constrain the angle-of-rotation of ram 41. As with all the motor or actuating means utilized by the tool changer 24, hydraulic cylinder 43 is operatively connected to control unit 11.

The axial position of rod 101 and, therefore, lever actuator 105, is monitored by means of arm 123 extended between a pair of limit switches 124 and 125 being operatively connected to control unit 11.

The shuttle 44 comprises a support carriage 126, a slide block 45 and a set of tool grippers 46 and 47. The support carriage 126 is affixed to peripheral ledge portion 107 of ram 41, for example, by bolts 127 and 128, for causing coincidental axial and rotational movement therewith. The bottom of support carriage 126 is provided with an elongate slide receiving trough 129 having sloped side walls for slidably trap mounting wall portions 130 and 131 of a slide block 45 (see FIG. 10). Trough 129 extends laterally across the length of support carriage 126 to enable the slide block 45 to be shuttled (slid) from end-to-end thereof. Stop means 132 and 133 are provided on each end of the support carriage 126 for locating the slide block 45 and gripper 46 and 47 at a first 134 and a second 135 (shown partly in phantom outline FIG. 9) index position each corresponding to the tool exchanging positions discussed above. Slide block 45 has an elongate slot 136 (see FIG. 13) adapted for receiving gripper rod 101 therein, while not restricting the shuttle motion of slide block 45. An adjustment bolt and spacer 137 are provided within trough 129 for providing an adjustable slide surface for slide block 45.

The slide member or block 45 includes a lower housing 138 having an internal cavity 139 in which a U-shaped lever actuator 105 is upwardly and downwardly movably mounted. Lever actuator 105 is affixed to the bottom end of gripper rod 101 for being translated upwardly and downwardly therewith. Lever 140 and/or a second lever 140A (not shown) has two lever arms 141 and 142 each extending laterally in opposite directions from a pivot point 143 and terminating in a contoured 144A head 144 and 145, respectively. Head 144 and/or a second head (not shown) is selectively positioned (during shuttle indexing motion of slide block 45) within the slot of U-shaped lever actuator 105 and is then caused to pivot about or on pivot pin 143 with upward and downward translation of gripper rod 101. Head 145 and 145A are trapped within either of the pivot actuating receiving slots 146 and 147 of the two separate actuator sliders 148 and 149, respectively. Shuttle indexing of the slide block 45 and grippers 46 and 47 sidewardly to the right is illustrated in phantom outline FIG. 9. Each actuator slider 148 and 149 is upwardly and downwardly slidably mounted in operative association with a respective one of the grippers 46 and 47. Each actuator slider 148 and 149 is biased upwardly by a pair of helical springs, with gripper 47 springs 150 and 151 being shown in FIG. 11 for illustration. In this manner, either gripper actuator slider 148 or 149 may be operatively and separately engaged by lever head 145, 145A with shuttle 44 being positioned respectively in position 134 and 135 (see FIG. 9).

Each actuator slider 148 and 149 is affixed on its sides to detent slide racks or bars 152, 153, 154 and 155, respectively. Each detent bar is slidably received within a respective guide/mounting slot on a side of gripper. The lower ends of each detent bar, for example, bar 154 and 155, contains a contoured or cam surface 156 and 157, and a detent ball receiving alcove 158 and 159, respectively. As illustrated in FIG. 11, with the actuator slider 149 being biased in an upward direction, detent balls 58 are cammed or urged outwardly toward each other for gripping or engaging respective sides of a tool for holding same therebetween. To release a tool 160 (shown in phantom outline in FIG. 10) from gripper 47, actuator slider 149 is moved downwardly by lever head 145, such that detent balls 58 are free to move or lodge within a respective alcove 158 and 159. With shuttle motion of the grippers 46 and 47 to the other lateral index position 135, gripper 47 is positioned to the right as illustrated in phantom outline in FIG. 9. Gripper actuator slider 148 and pivot lever 140A (not shown) is then aligned with "U" shaped lever actuator 105 at the end of the gripper rod 101 for being downwardly/upwardly translated, with vertical movement for detent actuation as discussed above with reference to gripper 47.

TOOL STORAGE/FEEDER MECHANISM

With particular reference to FIGS. 14 and 15, the tool storage/feeder mechanism 23 can be seen to generally comprise an indexable drum 27 and an internally mounted comb-feeder mechanism 28.

The storage drum 27 has a circular configuration with a plurality of spaced facets 30 having elongate rectangular slots, for example, twelve such facets and each dimensioned and contoured for mountingly receiving a respective tool storage magazine 29. Each facet 30 has a detent or clip means 161 for accurately securing a tool storage magazine 29 thereto. The storage drum 27 is mounted on bearing 162 for being bidirectionally rotatable to selected predetermined index (tool magazine) positions by, for example, a worm gear 163 driven by servo motor 164, the servo motor 164 being operatively connected to control unit 11. Uniformly spaced about the circumferential bottom surface 165 of drum 27 are a plurality of shot pin holes 166. In accordance with the present embodiment of the invention, twelve such shot pin holes 166 are provided each corresponding to a predetermined drum index position for aligning a respective facet and magazine at the home position A (see FIG. 2), in operative alignment relative to the comb feeder mechanism 28 and the shuttle 44. Thus, with rotation of drum 27 to a selected index (magazine position), as determined by control unit 11, a shot pin 167 may be inserted within the respective index position shot pin hole 166 for accurately securing or locking the drum 27 in position. The shot pin 167 may be driven by means of hydraulic cylinder 168.

Each storage magazine 29 has detent or other holding means 170, for example, detent balls for holding tool 171 uniformly spaced in vertical column along the long axis of the magazine 29. The spacing 173 between tool 171 stored within a magazine 29 is predetermined to be a distance greater than the thickness 174 of the comb teeth 31.

The comb-feeder mechanism 28 is mounted on a support platform 175 and extends upwardly within cavity 55 of drum 27. The comb plate 180 is slidably mounted between a pair of spaced guide/support beams 181 and 182. Beams 181 and 182 are mounted vertically by any conventional means such as bolts 177. The comb plate 180 has elongated keyway 183 which extends laterally across comb plate 180, and elongated slot 184 having its long axis normal to keyway 183. A first drive rod 185 is slidably mounted within alcove 186 of beam 181. Affixed to rod 185 by pin or rivet 187 are slide key 188 contoured for being slidably received within keyway 183.

A second drive rod 189 is slidably mounted within alcove 190 of beam 181, and includes serrate teeth forming a rack 191. Slide members 192 are slidably received within slots 184 and have cantilever pins 193 projecting outwardly therefrom. Offset gears 194 are rotatably mounted about pins 199 and have curved sections 195 with projecting gear teeth engagable with rack 191. Pins 199 extend inwardly from a portion (not shown) of beam 181.

Each rod 185 and 189 is operatively coupled, via a clevis joint 196A and 196B, to a hydraulic piston 197 and 198, respectively. The hydraulic pistons 197 and 198 are selectively, via control unit 11, vertically translated by a hydraulic cylinder 34 and 35, respectively. The mounting plate 175 and hydraulic cylinders 33, 34 and 168 are mounted within housing 36 (see FIG. 1).

With actuation of hydraulic cylinder 34, rod 185 is upwardly/downwardly translated which in turn, with key 188 abutting portions of keyway 183 and 184 slidingly mounted about slide member 192, causes coincidental upward/downward positioning of comb plate 180.

With actuation of hydraulic cylinder 33, rod 189 may be upwardly and downwardly translated for causing gear 194 to rotate about pin 199. An upward travel of rack 191 causes counterclockwise rotation of gear 194. A downward travel of rack 191 causes clockwise rotation of gear 194. A counterclockwise rotation of gear 194 cams, via slide 192 and pivot pin 193, comb plate 180 in an outward direction. A clockwise rotation of gear 194 cams comb plate 180 in an inward direction. In this manner, the comb plate 180 may be caused to move in a rectangular-like motion to enable incrementing (upwardly or downwardly) tools with selective actuation of hydraulic cylinders 33 and 34.

While the invention has been described with respect to a preferred embodiment, it should be apparent to those skilled in the art that numerous modifications may be made thereto without departing from the spirit and scope of the invention.

I claim:

1. A system for mounting a tool on a turret or tool block, comprising:

automatic control means;

a turret or tool block having a base portion and a tool clamping unit with securing means actuatable for engaging a tool deposited within the clamping unit, wherein said turret has a selectively indexable face plate member, said face plate member having a plurality of tool holders each provided with a discrete securing means with a leverarm actuating member, said base portion having an internal cavity;

actuator means mounted on said turret or tool block and being responsive to said automatic control means and actuator means within said base portion and responsive to manual manipulation, each said actuator means including at least one hydraulic cylinder having a piston, which initiates actuations of said securing means, wherein said actuator means includes a hydraulic cylinder having a piston extendable within said internal cavity, a split collar positioned within said internal cavity and having a generally central alcove for clampingly receiving a portion of said piston and said collar being coincidentally translatable with said piston, an intermediate shaft extending from a portion of said split collar distal from the central alcove and having an abutment end portion extendable without said portion upon actuation of said hydraulic cylinder, a plurality of actuator pins each slidably mounted within a portion of the face plate member and having a first end engageable with a respective one of said leverarm actuating members and a second end being selectively engageable by the abutment end portion of said intermediate shaft in response to selective indexing of said face plate member and actuation of said hydraulic cylinder;

a tool storage and feeder mechanism for selectively presenting a tool at a predetermined storage location in response to said automatic control means; and a tool manipulating and transporting means responsive to said automatic control means for obtaining the selected tool from said tool storage and feeder mechanism at said predetermined storage location and for positioning the selected tool within said tool clamping unit.

2. A system for mounting a tool on a lathe turret or tool block, comprising:

control means;

a turret or tool block having a tool clamping unit with securing means actuatable for engaging a tool deposited within said clamping unit;

actuator means mounted on said turret or tool block and being responsive to either (a) said control means or (b) manual manipulation, each said actuator means including a hydraulic cylinder having a piston, which initiates actuation of said securing means;

a tool storage and feeder mechanism for selectively presenting a tool at a predetermined storage location in response to said control means;

a tool manipulating and transporting means responsive to said control means for obtaining the selected tool from said tool storage and feeder mechanism at said predetermined storage location and for positioning the selected tool within said tool clamping unit;

the tool storage and feeder mechanism comprising circular rotatably mounted tool storage drum means having a plurality of spaced magazine receiving facets and an internal cavity, said drums having tool feeder means mounted within the drum cavity and having a plurality of vertically aligned teeth each being positioned normal to and parallel with the rotational axis of said storage drum;

the tool feeder means comprising a generally rectangular plate mounted for lateral and vertical movement and having a first hydraulic cylinder connected to said rectangular plate for causing vertical movement thereof, and a second hydraulic cylinder connected to said rectangular plate for causing lateral movement of said rectangular plate.

3. A system for mounting a tool on a lathe turret or tool block, comprising:

control means;

a turret or tool block having a tool clamping unit with securing means actuatable for engaging a tool deposited within said clamping unit;

actuator means mounted on said turret or tool block and being responsive to either (a) said control means or (b) manual manipulation, each said actuator means including a hydraulic cylinder having a piston, which initiates actuation of said securing means;

a tool storage and feeder mechanism for selectively presenting a tool at a predetermined storage location in response to said control means;

a tool manipulating and transporting means responsive to said control means for obtaining the selected tool from said tool storage and feeder mechanism at said predetermined storage location and for positioning the selected tool within said tool clamping unit;

the tool storage and feeder mechanism comprising a circular rotatably mounted tool storage drum means having a plurality of spaced magazine receiving facets and an internal cavity, said drum having tool feeder means mounted within the drum cavity and having a plurality of vertically aligned teeth each being positioned normal to and parallel with the rotational axis of said storage drum;

the tool feeder means comprises a generally flat rectangular plate member mounted for movement laterally and vertically and having a first lateral elongated keyway, a second vertical elongated keyway, a first key extending from a vertically slidable drive rod and being received within said first keyway, a pair of second keys vertically spaced and received within said second keyway and each having a first pivot pin extended therefrom, a pair of offset gear-like members each rotatable about a second pivot pin and having a hole offset from said second pin for receiving said first pivot pin, a second vertically slidable drive rod having a gear rack engagable with said gear-like members, a first hydraulic cylinder connected to said first drive rod and being actuatable with said gear-like members, a first hydraulic cylinder connected to said first drive rod and being actuatable for effecting engagement of said first key with said plate member for vertical disposition thereof, a second hydraulic cylinder connected to said second drive rod and being actuatable for effecting vertical movement thereof causing said gear-like members to be rotated about said second pivot pins with engagement of said gear rack, rotation of said gear-like members laterally moving said first pivot pins and said keys such that said plate member is translated laterally.

* * * * *

UNITED STATES PATENT AND TRADEMARK OFFICE
CERTIFICATE OF CORRECTION

PATENT NO. : 4,577,389
DATED : March 25, 1986
INVENTOR(S) : Walter Shultz

It is certified that error appears in the above—identified patent and that said Letters Patent are hereby corrected as shown below:

Column 5, line 27 "loading" should be --indexing--.

Column 12, line 15 "present" should be --preferred--.

Column 12, line 60 "34 and 35" should be --34 and 33--.

Signed and Sealed this

Twenty-ninth Day of July 1986

[SEAL]

Attest:

DONALD J. QUIGG

Attesting Officer

Commissioner of Patents and Trademarks